United States Patent [19]
Pearson

[11] Patent Number: 5,875,328
[45] Date of Patent: Feb. 23, 1999

[54] FAULT IDENTIFYING CONTROL SYSTEM

[76] Inventor: Martin Thomas Pearson, 4291 Winnifred Street, Burnaby, British Columbia, Canada, V5J 2S5

[21] Appl. No.: 718,717

[22] Filed: Sep. 24, 1996

[51] Int. Cl.$^6$ .................................................. G06F 9/00
[52] U.S. Cl. ................ 395/674; 395/185.01; 395/182.3; 364/132
[58] Field of Search .............................. 395/183.1, 183.2, 395/183.07, 181, 183.15, 183.16, 187, 183.18, 184.01, 185.01, 185.04, 800.25, 800.26, 800.27, 837, 849, 869, 377, 565, 898, 886, 672, 673, 674, 676, 183.13; 364/132, 138, 148, 153, 167.01; 318/600, 625, 573

[56] References Cited

U.S. PATENT DOCUMENTS

| | | | |
|---|---|---|---|
| 3,757,095 | 9/1973 | Kiwiet | 318/571 |
| 4,319,321 | 3/1982 | Anastas et al. | 395/674 |
| 4,802,116 | 1/1989 | Ward et al. | 395/674 |
| 5,222,017 | 6/1993 | Yellowley et al. | 364/132 |
| 5,313,628 | 5/1994 | Mendelsohn et al. | 395/182.3 |
| 5,394,323 | 2/1995 | Yellowley et al. | 364/167.01 |
| 5,533,195 | 7/1996 | La Rochelle et al. | 395/185.01 |

*Primary Examiner*—Larry D. Donaghue
*Attorney, Agent, or Firm*—C. A. Rowley

[57] ABSTRACT

Operation for each action of a machine is individually controlled by providing a file of set of components necessary to carry out the operation and a file of a set of components that are available and then determining in sequence whether each required component is also available and transferring those components that are both required and available in sequence to a fault file. The fault file may then be read in sequence and used to control the action being controlled so that if anyone of the required components is not available, the fault file so indicates and terminates the operation based on the first component found to be inoperative so that it is an easy matter to define the source of the problem.

5 Claims, 5 Drawing Sheets

FAULT IDENTIFYING CONTROL SYSTEM

FIELD OF INVENTION

The present invention relates to a control system, more particularly, the present invention relates to a modular fault identifying and control system suitable for use in simple or complicated systems.

BACKGROUND OF THE INVENTION

Generally, the control system for controlling the operation of equipment, particularly complicated equipment where a number of different elements must start-up in sequence in order to achieve a desired output require a relatively complicated controls to ensure that the required elements are components of the system are operative.

Systems are known to maintain the machine or equipment on target, e.g. computer controls that measure or estimate trajectory error and adjust the controlled system to ensure it follows more closely a designated path or trajectory.

U.S. Pat. No. 5,222,017 issued Jun. 22, 1993 to Yellowley et al. describes a computer control system that incorporates a plurality of slaves and a flagging system that influences the operation when any one of the monitored conditions reaches an unacceptable level. Again, this system is primarily used for machine control maintaining a required trajectory as opposed to machine or module start-up and identification of unavailable or faulty components

BRIEF DESCRIPTION OF THE PRESENT INVENTION

It is an object of the present invention to provide a simple module that may be expanded upon and used in a variety of different situations to control the start-up and/or operation of a process or machine.

Broadly, the present invention relates to a method of controlling at least one module in a system said control comprising providing in said at least one module a first file of a first set of designated components used in said at least one module, providing a second file of available components for said at least one module, updating said second file to define which of said components are currently available components in said second file, comparing said designated components in said first file with said currently available components of said second file to determine the status of said components as currently available or not currently available, transferring status of each of said components to a fault file register in a selected sequence, comparing said statuses in adjacent pairs in said sequence, operating said at least one module when said adjacent pair of statuses being compared are the same to indicate that operation of said at least one module is acceptable and deactivating said at least one module when one of said pair adjacent statuses being compared are different and indicating the component represented by the last status compared is a first fault component.

Preferably said system will further comprises a plurality of individual modules interconnected via their respective first and second files which are compared to determine status and to control their respective modules and said system based on differences between said statuses of said adjacent pairs being compared.

Preferably said first files for one module of said plurality of modules will include at least one of said components of said first file of another modules of said plurality of modules in said system.

A control for controlling at least one module in a system said control comprising a first file of a first set of designated components used in said at least one module, a second file of components available to operate said at least one module, means for updating said second file to define which of said components are currently available components in said second file, a first means for comparing in sequence said designated components in said first file with said currently available components of said second file to determine the status of said components as currently available or not currently available, means for transferring statuses of each of said components to a fault file register in said sequence, a second means for comparing said statuses from said fault file register in adjacent pairs in said sequence and means for permitting operation of said at least one module when said statuses of said pair being compared are the same to indicate that operation of said at least one module is acceptable to said pair of components whose status is being represented by said pair of statuses being compared, for deactivating said at least one module when one of said pair statuses being compared are different and for indicating said component represented by the last status compared is a first fault component.

Preferably said system will further comprises a plurality of individual modules and means interconnecting respective first and second files of selected different modules of said plurality of modules.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
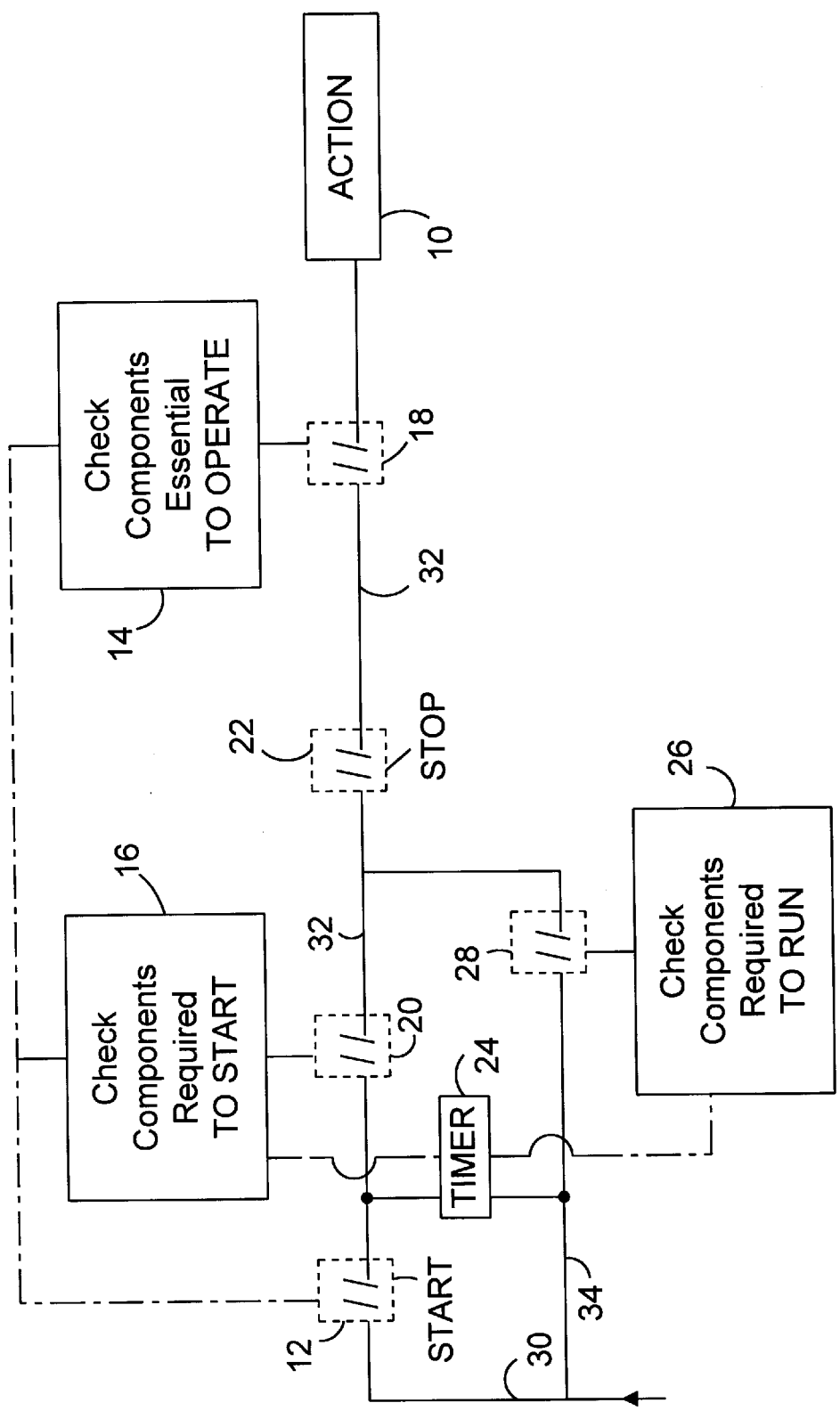
FIG. 1 is a schematic illustration of a control for monitoring and controlling an action.

FIG. 1 shows a module for controlling an action 10 illustrating the basic elements of a control system.

In the arrangement illustrated, a start switch 12 first initiates a checking operation wherein the status of components essential to operate the action 10 contained in an essential component file or register as indicated at 14 and of the components required to start action 10 contained in required components register or file as indicated at 16 are reviewed to ensure the action 10 may be commenced. Checking operations 14 and 16 will be described in detail hereinbelow, but are set so that if the components essential to operate 14 are available (in condition to operate) a go signal "GO" is provided to the controller 18 (otherwise it is not) and if all of the required components to start 16 are available the switch or the controller 20 is provided with a go signal "GO". This provides a direct command (assuming the stop switch 22 has not been activated to prevent operation of the action 10) to start action 10.

The start switch 12 preferably, also operates a control timer 24 which activates the check components required to run system 26 after a time delay from start of the action 10 sufficient for those components that are only checked when the unit is running as indicated at 26 have reached at least minimum running condition, i.e. the action 10 has been operating for the required time to develop the required, say, oil pressure or temperature or other component to be checked when the unit is operating.

Any component required to start and also required to run will appear in both registers 16 and 26.

The timer 24, shortly after actuation of the required to run file 26 may terminate the operation of the required to start file or unit 16 and disconnect the line 30 from the line 32, i.e. switch 12 and 20 are in the "OFF" position so that the path from line 30 to line 32 now must follow line 34, controller 28 line 32 and to action 10 so that for action 10 to continue to operate requires that the controllers 18, 22 and 28 be in "GO" position and the controllers 12 and 20 are now isolated and their actions irrelevant.

It will be apparent that the components contained solely in the unit or file 16 are those components that are required for start-up and do not serve any function thereafter (any that are required after to start up are also the run file 26 and will be monitored via that file after startup). The components in the unit or file 14 are components that must operate at all times, both for start-up and for continuing to run the action 10, whereas the components in the file or unit 26 are those components, the status of which must be within the required range to permit the action 10 to continue to operate or run.

It will be apparent that the simple control module of FIG. 1 can be applied to any action 10 to control and monitor its operation. The system of the present invention that also permits detecting a first fault that necessitated or triggered shut-down or termination of the an operation or action such as action 10 will be described hereinbelow.

Figure 2:
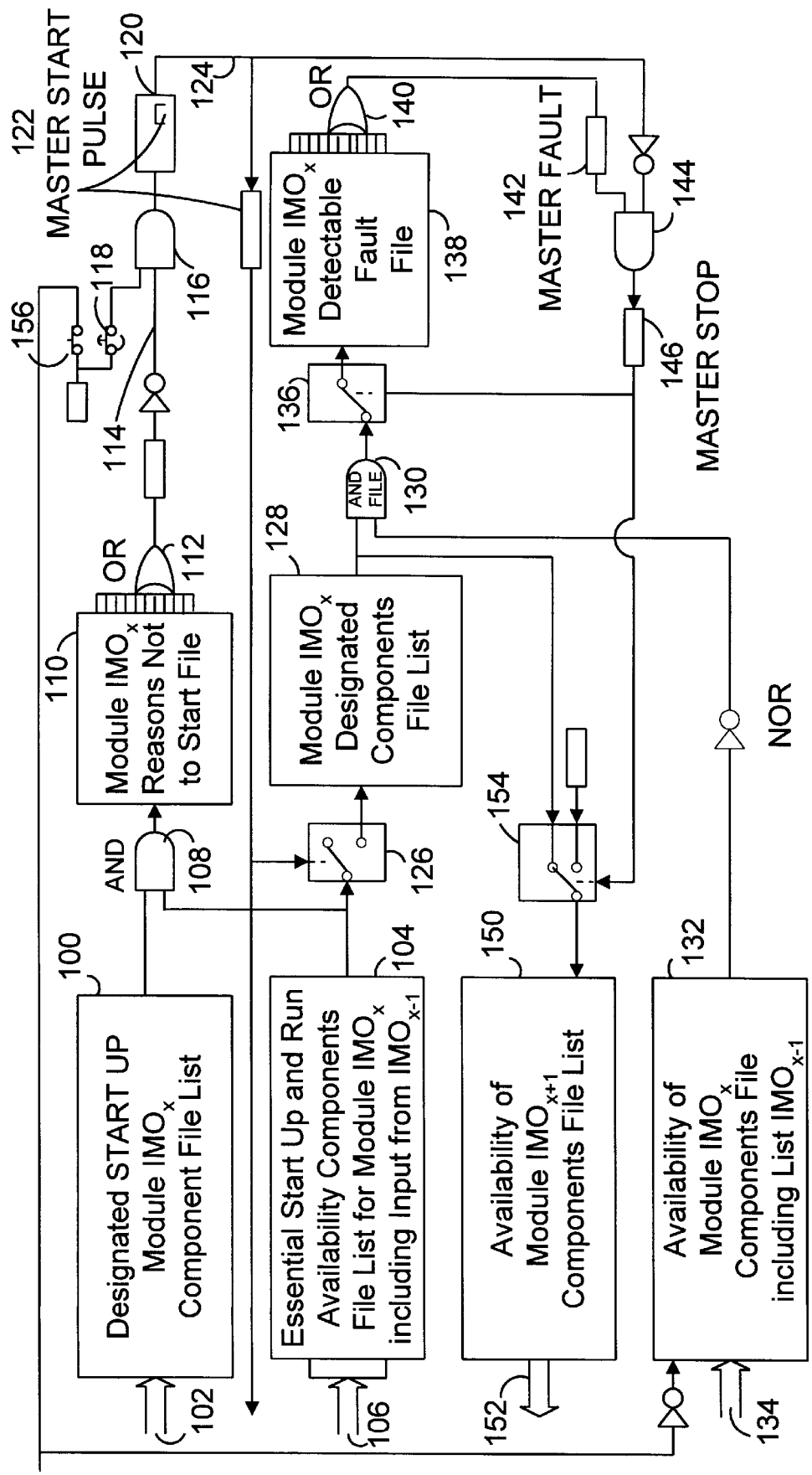
FIG. 2 is a more detailed arrangement showing a fault identifying system for controlling and monitoring, a plurality of actions.

FIG. 2 shows an operating system of the present invention incorporating a start-up module and a running module and providing for additional modules for yet another action of a plurality of actions. The arrangement or system of FIG. 2 is slightly different from that described above and illustrate in FIG. 1 but the components operate in essentially the same manner.

The designated start-up components are contained in file 100 and are inputted into the file 100 as indicated by the arrow 102 for example manually. This list in the arrangement of FIG. 2 includes those components necessary to start as well as those essential to the operation i.e. in effect registers 14 and 16 described above. The availability of each of the designated start-up components is contained in file 104 which is inputted from other modules, e.g. higher and/or lower modules in the system or manually as indicated by arrow 106 to provide the list of components and to indicate their availability or lack of availability to operate. This list, in the illustrated arrangement, in the register or file 104 may also includes the components required to run a second action.

In operation, the designated start-up components as listed in sequence in file 100 are ANDED with the corresponding components from the start-up and run availability file 104 and if components in file 100 are in the required condition as indicated by file 104, the AND gate 108 forwards them into a fault file 110 indicating that they are available. The components are processed by AND gate 108 in sequence to form a sequential list of available or operable components in the fault file or register 110 containing the components required to start.

The OR gate 112 compares adjacent components in the series in the file 110 and if both are in the required condition, a signal is passed along line 114 to the AND gate 116, this signal remains "GO" as long as both sides tested by the OR gate 112 indicate availability. It will be apparent the first time one of the components in the fault file 110 is indicated as not available (i.e. not forwarded by the AND gate 108), the STOP signal will be sent to line 114 and AND gate 116 which aborts the operation. By review of the file 110, it is immediately apparent which component caused the failure to start.

In the illustrated arrangement, a manual switch 118, if actuated at the same time as the "GO" signal is received in the line 114 and thus in the AND gate 116, initiates the operation of the timer 120 which initiates a timed pulse 122 on line 124 which will initiate start up of a second action (in this case the first action was to turn on the timer 120 and initiate the pulse 122) by shifting the move file switch 126 from the position shown to a position that connects the file 104 to the second action designated component register or file 128 whereby all of the components essential to the operation and to the running of the second action are transferred to file 128 so that the second action designated component file 128 lists all of the components required to operate the second action.

The components as required for the second action and contained in file 128 are then compared via an AND gate as indicated at 130 with information indicating availability of each of these components as contained in second action available component register or file 132. The available component register 132 is inputted as indicated by the arrow 134 manually or automatically from a previously initiated action from modules higher or lower in the sequence with those files or components that are available and required for the second action. If the component is available or operable, i.e. in the required state, they are fed via move switch 136 into a second action detectable fault register or file 138. This file 138 is then read as indicated by the OR gate 140 in the same manner as the file 110 so that as long as both adjacent components of a list are in the same condition, the "GO" signal is provided by the OR gate 140. This signal indicates, as designated at 142, whether or not a fault occurs in the system and is ANDED in the AND gate 144 with a signal in line 124. The signal in line 124 indicates that the system is in the "GO" condition.

If both signals in line 124 and fault signal 142 when ANDED in gate 144 indicate all is well (GO), the system continues to operate. However, if a fault is detected and the AND gate 144 send out the opposite signal (STOP) the fault as indicated at 146 triggers the switch 136 to move from the closed position illustrated to the open position (not shown) and stops the operation. This ensures that when the operation stops, the last file that was compare in OR gate 140 is clearly distinguishable so that it is now very apparent which one of the components listed in register 138 was the first to fail and caused a master fault stopping of the operation. These operations are repeated continuously so that substantially as soon as a significant fault occurs, it turns off the operation and is detected. The frequency of the iterations may be selected based on the components being monitored and may be asynchronys.

Assuming all is operating properly, the designated components listed in file 128 may be carried forward as a part of third action availability component file as indicated at 150 and thus, outputted as indicated at 152 to the next unit or action to form part of the equivalent file to file 104 for the next unit or action to take place in the startup of a mill or the like.

It will be apparent that if a fault is indicated at 146, the feed forward from file 128 to 150 is terminated by the switch 154 and the components available for the third action are indicated as not available in file 150.

This arrangement or module may be repeated for any number of action with the feeding forward or backward of the necessary data on availability of required components. The initial required components obviously have to be inputted manually when the system is designed or changed.

With this system, the master stop button 156, if actuated, will close the system down.

It will be apparent that when operating only in a local mode, i.e. the module IMO is operating independently, detection of a fault will affect or close down that particular module only. On the other hand, when the affected module is only one of a plurality of interconnected modules, detecting a fault in one module will initiate a stoppage of all of the interconnected modules.

Figure 3:
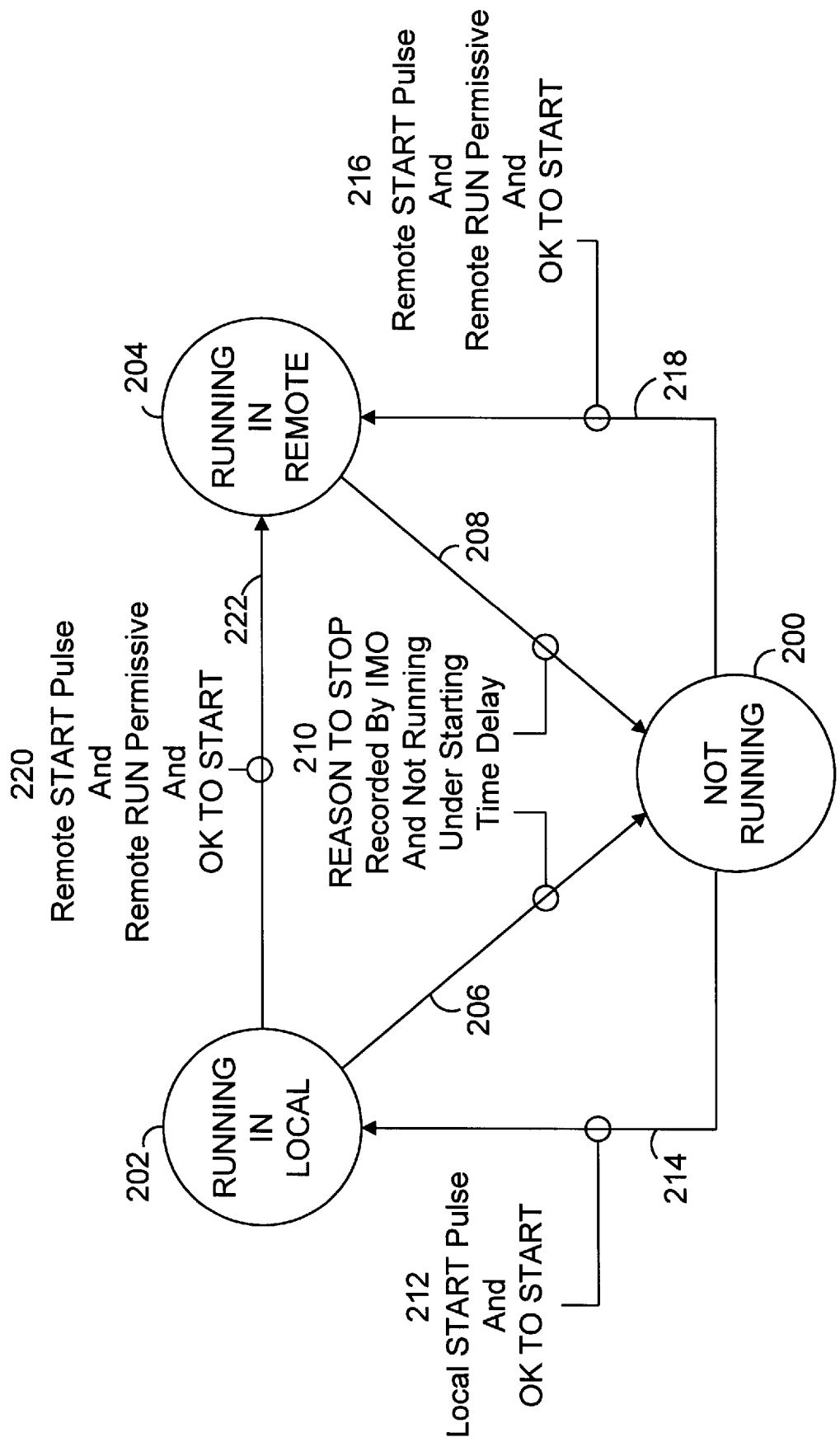
FIG. 3 is a schematic illustration of the operation of an integrated system employing the present invention.

FIG. 3 shows a typical arrangement which the present invention may be employed and wherein the special effects of the present invention are shown.

Generally, any piece of equipment, particularly if it is part of an overall system, for example, a press, require a number of components such as motors to drive the press hydraulic cylinders to apply the load and a number of other functions that are carried out by different operating mechanisms, some of which may be required to be operating before another part may be started. For testing, some components must be operated independently of the other components or modules of the system. Sometimes, it is also desirable to remotely start one of the modules and include it or add as a further module in the system.

FIG. 3 schematically represents a preferred arrangement for setting up the basic elements or modules of the present invention into an overall system. As shown in FIG. 3, any one of the independently controlled modules that may be combined to form a more complete control system is either 1. not running as indicated at 200, 2. running in a local mode as indicated at 202, or 3 running in a remote control mode as indicated at 204.

When the module is running either in local, remote may be stopped as indicated by the arrows 206 and 208 respectively by one of the detectable fault files indicating that a component of one of the modules of the system is not available as indicated at 210 thus, the machine must stop. When running in local, the only faults that will stop the local running is a fault in a component necessary for that particular module. However, when running in remote, the whole unit may stop by a fault being detected in any one of the separate modules forming part of the whole system.

When the machine is not running as indicated at 200, starting to run in local mode requires a local start pulse 212 and an OK to start determined, i.e. the fault file 210 must indicate that there is no fault to prevent starting of the module for running by itself, i.e. running local and the start pulse must be provided as indicated at 212 and by the arrow 214 indicating transfer from not running to running in local.

Remote start controls the start up is based on remote start pulse and the required run permissive OK to start as indicated at 216 which carries forward to running in remote as indicated by the arrow 218, i.e. there can be no reasons not to start activated components in file 210 that are required for the operation of the module being started.

Another condition that may occur is when one module is already running in local and it is made a module of a larger system and be controlled as a part of the larger system, i.e. a module is converted from running in local to running in remote. To do this, remote start and remote run permissive and OK to start conditions as indicated at 220 must be acceptable for the running in local to transfer to running in remote as indicated by the arrow 222.

Figure 4:
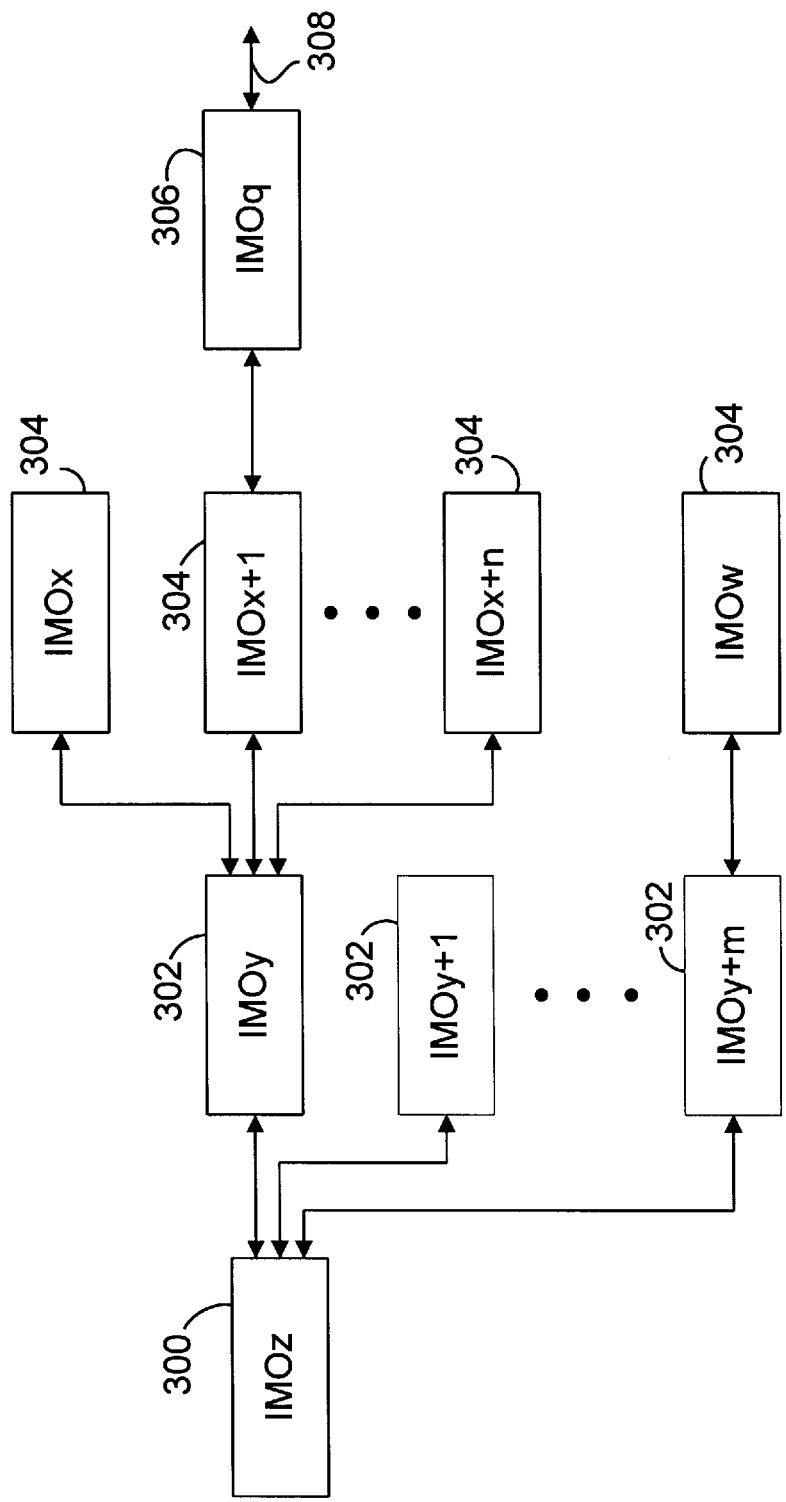
FIG. 4 shows a plurality of discrete modules combined to a form system consisting of a plurality of module which may be integrated at different levels as required.

FIG. 4 schematically indicates a system containing a number of different modules and provide an illustrative example of how such modules may be combined. In the illustrated arrangement, the master module (Interlock Machine Object (IMO)) is indicated as IMOz at 300. This module directly controls (in the illustrated arrangement) a number of different sub-modules at sub-module level y indicated at 302 as modules IMOy, IMOy+1 to IMOy+m. In this system, the sub-modules 302 are one control level below the master module 300. In the illustrated arrangement, the sub-module IMOy also operates and communicates directly with three modules 304 on the next lower module level in the system (sub-module level x) as indicated by IMOx, IMOx+1 to IMOx+n. Each one of these sub-modules may also communicate with and control modules lower on hierarchy as indicated at the next lower level 306 IMOq (sub-module level q). As will be apparent, the master 300 could be made a sub-module of other modules by providing the appropriate inputs and outputs to between module 300 and the other module.

Some of the modules at the level y, IMOy+m has been illustrated as controlling another sub-module IMOw (at module level w) and all of the sub-modules 302 may similarly control a plurality of different sub-modules 304 which in turn may control lower level modules such as that illustrated at 306 and as represented by the arrow 308, sub-modules 306 may also control further modules different levels and they in turn may control other modules. The interconnection of modules may be repeated as many times as desired for any of the modules or sub-modules modules 300, 302, 304, 306, etc. to control many sub-modules.

Each of the modules communicates back and forth with modules and sub-modules at different levels (higher and/or lower) to which it is connected and communicates.

The modules 302 appear to be totally independent except for their connection to module 300. However, this connection via the module 300 may integrate all of the modules 302 so that if one is stopped, all are stopped as the modules 302 communicate their condition to the module 300.

Figure 5:
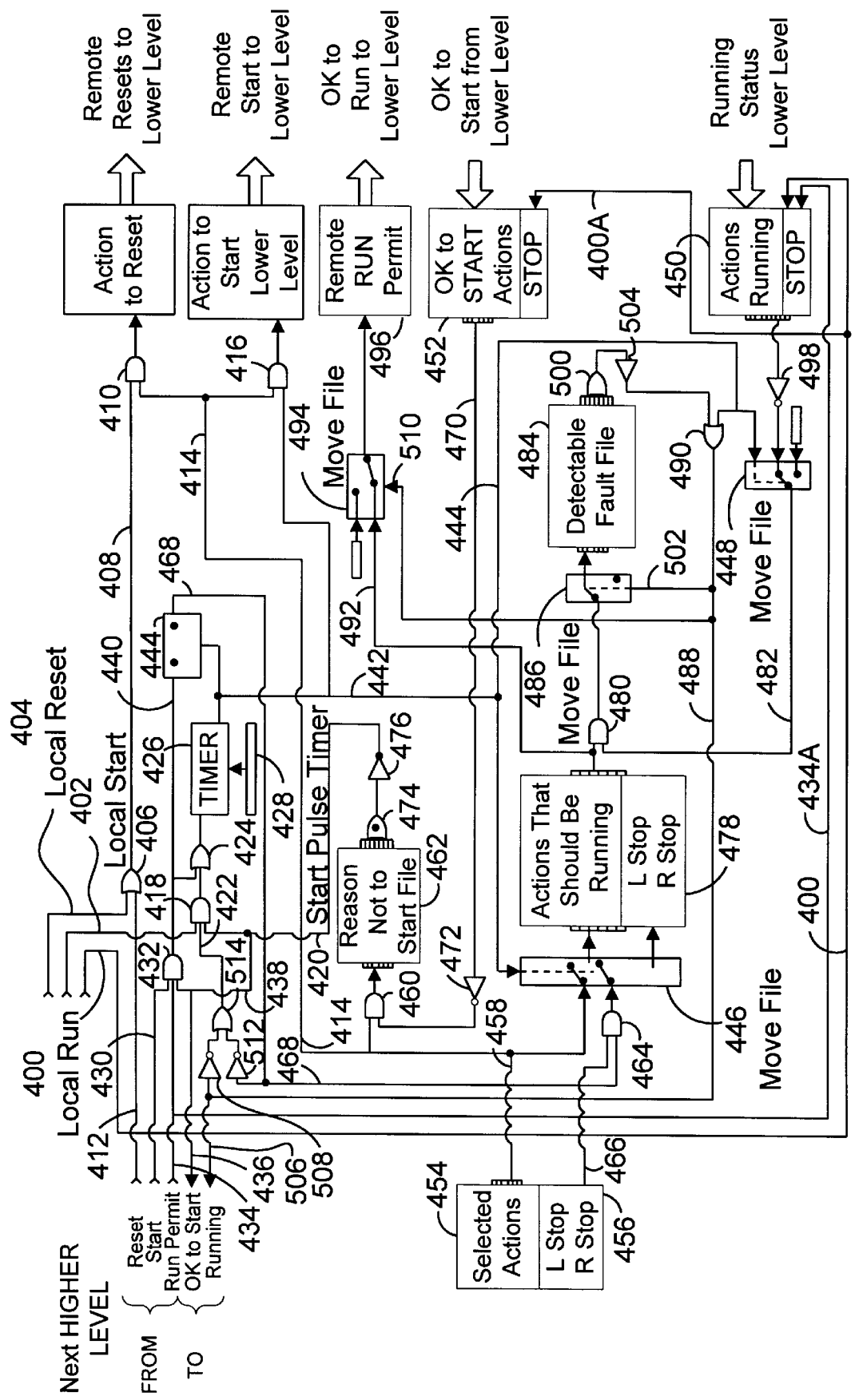
FIG. 5 is a schematic representation similar to FIG. 2 but showing the plurality of discrete module and a manner of interconnection to permit local starting and local running of a selected module or running as part of a complete or larger system.

The above modular system will be made clearer from a review of FIG. 5 which shows in more detail an intermediate stage in a modular system incorporating the present invention. This stage may be operated in a local mode (independent of other stages or modules) or in combined mode with other modules or IMOs.

Operating a module in a local mode requires local run, local start and local reset inputs be applied via lines 400, 402 and 404 respectively.

The local reset is activated to reset the equipment that needs resetting to start operating in the local mode. This signal passes through an OR gate 406 which provides a signal via line 408 as one of the input signals to the AND gate 410. Alternatively, if a remote start is to be carried out, remote reset signal is pass as indicated by line 412 to the OR gate 406 and delivers a signal to the line 408 and thus, to the AND gate 410. Thus, either the remote start signal in line 412 or the local start signal in line 402 provides one of the signals to the AND gate 410. The other signal delivered to the AND gate 410 is delivered via 414 which also delivers the same signal to the end gate 416 as will be described hereinbelow.

The local start signal is delivered to the AND gate 418 which also receives input from lines 420 and 422 (to be described below) so that if any two of these lines 402, 420 and 422 provide the same signal, the OR gate 424 receives a signal to trigger the start timer 426 which delivers a pulse, the duration of which set by the start pulse timer 428 sufficient time for starting as above described.

The start timer 426 may also be remotely triggered via AND gate 432 which inputs include the remote start signal in line 430, the run permit signal in line 434 which signals the next higher level module indicates that running of the local system is permitted and the local system is OK to start signal on line 438. The OK to start signal from branch line 438 is directed forward to the next higher module via line 436 and used for remote start information. If any two of the signals in lines 430, 434 or 438 are triggered, a remote start is initiated and a start signal is provided on line 440, a branch of which inputs the OR gate 424 to trigger the timer 426 to output a pulse on line 442. The signal in line 440 also triggers the signaler 444 which signals that the start is local or is remote when activated via remote signal from line 440.

The module may be run using or based on the local controls only, i.e. local run, local reset, local start independent of both upstream and downstream, i.e. higher or lower level modules in the combined system.

The local run signal is delivered via line 400 to the downstream actions running file 450 via branch line 400A to the OK to the start actions file 452 composed of actions that are OK to start from a lower level and the run permit signal is delivered via line 434A to the actions running file 450. These lines 400, 400A and 434A deliver stop signals to the file 450 and 452. The local run signal may stop the operations of both files 450 and 452 whereas the run permitted signal from the next higher module level in lines 434A only affects and stops the file 450.

The timer pulse in line 442, which, as above described, may be derived either from a local start or a remote start is delivered by a line 444 to activate move files indicated at 446 and 448 when the module is to be started either remotely or locally.

Each module has selected or required actions (actions) which are included in a selected action file 454 which also includes a selected stop 450 and thereby provides a defined list of application that are deemed required to start and/or operate that module. These selected files (actions) are fed via line 458 to the move file 446 and to the AND gate 460 to form a reason not to start file 462, the operation of which will be described hereinbelow. The line 458 is also connected via line 414 into the AND gates 410 and 416 described above.

The stop signal 456 may be a local stop select (L stop) or a remote stop select (R stop) the conditions of which are delivered via line 466 to the AND gate 464. Also delivered to the AND gate 464 via line 468 is a signal indicating whether or not the start is a remote start or a local start. Thus, if the AND gate 464 is viewing a local stop signal indicating OK to go and a signal in the line 468 that the start is a local start, these signals will be ANDED in AND gate 464 and a local start activated as will be described below. Similarly, if a remote stop is selected and indicates OK to go, and the signal in line 468 indicates that a remote start has been initiated, this signal will again be transmitted to the next stage. On the other hand, if the local stop is activated if the conditions sent to the AND gate 464 do not properly match, no signal to start will be transmitted.

The items or action in the reasons not to start the file 462 are based on the selected actions in file 454 delivered via line 458 and the signals from the OK to start action in file 452 originating from a lower level which are delivered via line 470 and not file 472 to the AND gate 460 so that if any of the selected actions are ANDED with the OK to start actions in file 452 or with the stop file in 452, a reason to start file will be activated where a selected action is not OK to start or the stop signal is given in file 472, i.e. the stop signal will be a don't stop signal which will be reversed by the not file 472.

In any event, assuming the reasons not to start file indicates all elements are in the go position, each sequentially tapped via the OR gate 474 in the manner described above and signal passed to a not gate 476 which in turns feeds the line 420 so that if there is no reason not to stop presented in line 420, the AND gate 418 may be reactivated using the local start in line 402.

Triggering of the start file as above described, triggers the move file 446 and 448 to transfer the selected actions and the status of the L stop and R stop from file 454 to an action that should be running file 478 and these files are then ANDED in AND gate 480 with the actions running file from file 450 which are indicated as all being active by the move file 448 having being activated by the start pulse in line 444 so that a signal is transmitted in line 482 to AND gate 480 permitting transfer of all the action should be running files to the detectable fault file 484 via the move file switch 486 which is in the move file position as a result of the signal in line 488, again activated through OR gate 490 via the starting pulse from line 444.

The items in the actions should be running file 478 is also transferred via line 492 and move file 494 to the remote run permitted file 496.

At the termination of the start pulse in lines 444, those actions which should be running will be running in the move files 446, 448 and 486 will be in the positions as illustrated in this position. If there is no reason not to stop in line 482 as determined by the not file 498, the actions that should be running will be continuously transferred to detect the fault file and if anyone of these faults, it will be detected in the detectable fault file 498 via the OR gate 500 triggering the move file 486 via line 502 and not file 504 and OR gate 490. A signal in line 488 will indicate that either the module is running or if a fault is detected, that the module is not running and deliver that information to the line 506 to inform the next higher module and not to file 508. This triggering via the OR gate 500 will also trigger via line 510 the move file 494 indicating that the remote run permit 496 is not permitted.

The remote start signal in line 468 is also transmitted to a not file 512 and the outputs of the not files 508 and 512 are delivered to an OR gate 514 which provides the signal in line 422 delivered to the AND gate 418 to permit or not to permit a local start.

It will be apparent that in each module there is an interconnection and a clear indication of which of the detectable faults was the first fault instituting failure or stopping of the module and/or the connected modules from detectable fault file 484 which is in effect equivalent to the detectable fault file 138 described above. Similarly, the reasons not to start file 462 is similar to the reasons not to start file 110 described above with respect to FIG. 2.

The above described system forms one so called layer in the software of a control system for a process or machine and delivers instruction between IMOs as to whether it is OK or Not OK to run or Not Running, etc. It will be apparent that at another layer in the control system (not shown) for the IMO, the consequences of receiving a fault signal and how to shut down that IMO may be taken over by that IMO or module. Thus, for example, each IMO may have different requirements or sequence of actions that are initiated on receiving a signal such as Not OK to run.

Having described the invention, modifications will be evident to those skilled in the art without departing from the scope of the invention as defined in the appended claims.

I claim:

1. A method of controlling at least one module in a system said method comprising providing in each said at least one module a first file of designated components used in said at least one module, providing a second file of available components for said at least one module, updating said second file to define which of said components are currently available components in said second file, comparing said designated components in said first file with said currently available components of said second file to determine the status of said components as currently available or not currently available, transferring statuses of each of said components to a fault file register in a selected sequence, comparing said statuses in pairs in said sequence, operating said at least one module when said statuses in a pair being compared are the same to indicate that operation of said at least one module is acceptable and deactivating said at least one module when one of said pair of statuses being compared are different and indicating the component represented by a last status compared of said one said one of said pairs of statuses is a first fault component.

2. A method as defined in claim 1 wherein said system further comprises a plurality of individual modules interconnected via their respective first and second files and said method includes comparing statuses in each module of components in corresponding said first and second files of said modules to control their respective modules and said system based on differences between said statuses of said pairs in each said module.

3. A method as defined in claim 1 wherein said first files for one module of said plurality of modules includes at least one of said components of said first file of another module of said plurality of modules in said system.

4. A control for controlling at least one module in a system each said module comprising a first file of a first set of designated components used in said at least one module, a second file of components available to operate said at least one module, means for updating said second file to define which of said components are currently available components in said second file, a first means for comparing in sequence said designated components in said first file with said currently available components of said second file to determine the status of said components as currently available or not currently available, means for transferring statuses of each of said components to a fault file register in said sequence, a second means for comparing said statuses from said fault file register in pairs of adjacent statuses in said sequence and means for permitting operation of said at least one module when said pair statuses being compared are the same to indicate that operation of said at least one module is acceptable to said pair of components whose status is being represented by said statuses being compared, for deactivating said at least one module when one of said pair adjacent statuses being compared are different and for indicating said component represented by a last status compared of said one said one of said pairs of statuses is a first fault component.

5. A control as defined in claim 4 wherein said system further comprises a plurality of individual said modules and means interconnecting respective first and second files of selected different modules of said plurality of modules.

* * * * *